UNITED STATES PATENT OFFICE.

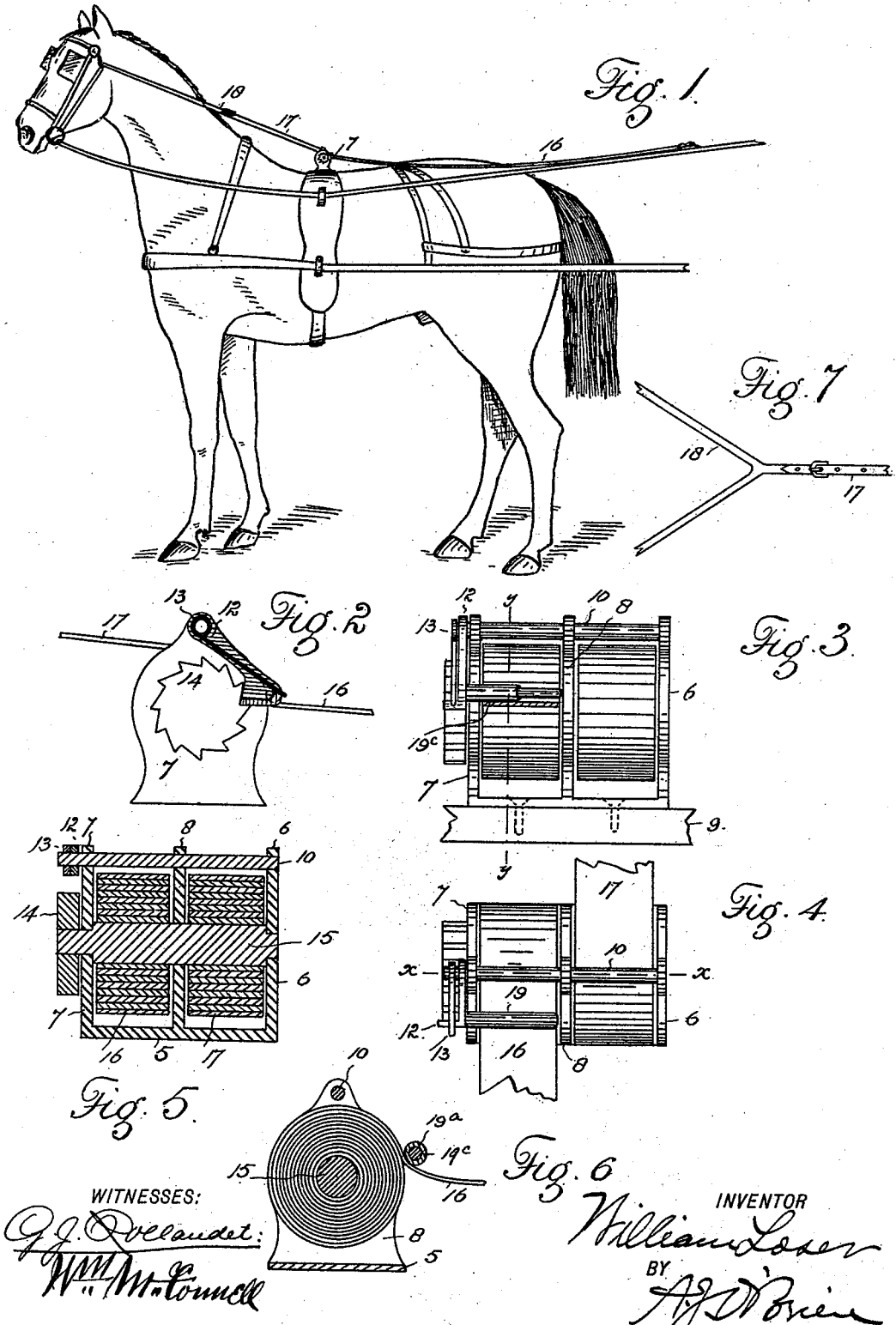

WILLIAM LOSER, OF DENVER, COLORADO.

CHECKING ATTACHMENT FOR HARNESS.

SPECIFICATION forming part of Letters Patent No. 499,172, dated June 6, 1893.

Application filed February 24, 1893. Serial No. 463,652. (No model.)

*To all whom it may concern:*

Be it known that I, WILLIAM LOSER, a subject of the Emperor of Germany, residing at Denver, in the county of Arapahoe and State of Colorado, have invented certain new and useful Improvements in Checking Attachments for Harness; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in checking attachments for harnesses, and the object of the improvement is to provide a device of this class whereby the driver may check and uncheck the horse at pleasure without leaving his seat in the vehicle.

To this end the invention consists of the features, arrangements and combinations hereinafter described and claimed, all of which will be fully understood by reference to the accompanying drawings in which is illustrated an embodiment thereof.

In the drawings, Figure 1 shows the device in place upon the harness. Fig. 2 is a side view of the attachment in detail and on an enlarged scale. Fig. 3 is a rear view of the device. Fig. 4 is a top view of the same. Fig. 5 is a section taken on the line $x$—$x$, Fig. 4. Fig. 6 is a section taken on line $y$—$y$, Figs. 3 and 5. Fig. 7 shows the manner of connecting the bridle rein with the attachment.

Similar reference characters indicating corresponding parts or elements of the mechanism in the several views let the numeral 5 designate the bottom plate and 6, 7 and 8 the vertical plates of a bracket attached to the saddle 9 of the harness in any suitable manner. The vertical plates are connected by the bottom plate with which they are preferably formed integral. A pin 10 passes through apertures formed in the top of the vertical plates and projects therefrom on one side sufficiently to form the support for a locking dog or pawl 12 which is pivoted thereon. Pin 10 is stationary and carries a coil spring 13 which is attached thereto at one extremity and to the dog 12 at the opposite extremity. The spring is so arranged that it normally maintains the dog 12 in engagement with a ratchet disk 14 made fast to a spindle 15 pivoted in the vertical plates and projecting outside of the bracket far enough to receive the disk. Attached to this spindle are two straps 16 and 17, the one being located between the plates 7 and 8, and the other between plates 6 and 8. These straps are made fast to the spindle at one extremity. Strap 17 extends forward and is attached to the check rein 18, while strap 16 extends backward and is attached to one of the driving reins within reach of the driver while sitting in the vehicle. The straps are wound upon the spindle in opposite directions. Hence as one is wound up the other is unwound. The locking dog 12 carries an arm 19 at one extremity. This arm is located outside of the vertical plates of the bracket and is preferably of a length about equal to the distance between plates 7 and 8, and should lie in about the same horizontal plane as the spindle 15, or so that a straight pull from the rear on strap 16 will raise said arm 19 and disengage the locking dog 12 from the ratchet disk. Arm 19 extends at right angles to the dog and is preferably of antifrictional construction, consisting of a spindle $19^a$ and an outer sleeve $19^c$ adapted to rotate and thus reduce to a minimum the friction between the arm and the strap. The rear extremity of strap 16 may be snapped into a ring upon one of the driving reins within reach of the driver, as shown in Fig. 1, and must be of sufficient length to allow free use of the driving rein without drawing the strap sufficiently taut to release the ratchet disk from engagement with the locking dog. Strap 16, may, of course if desired, be attached to the vehicle at any suitable point within reach of the driver, instead of being attached to the driving rein. The horse may be checked by pulling upon strap 16. The dog 12 is first disconnected from the ratchet disk. If it is desired to check the horse tighter the driver continues to draw upon the strap, thus rotating the spindle 15 and winding strap 17 therearound. If it is desired to uncheck the horse so that he may move his head downward as in the act of drinking, the driver ceases to pull upon the strap 16 as soon as the dog is raised out of the disk, except to keep the dog in the disengaged position. Then as the horse moves his head downward the strap 17 unwinds easily and allows him free use of his head. By pulling again on strap 16, strap 17 is wound upon the spindle and the horse again checked as tightly as desired.

This device occupies the same position on the harness as the ordinary check hook and will be found very convenient as well as reliable, durable, efficient and practicable in use.

Having thus described my invention, what I claim is—

1. In a checking attachment for harness the combination of a suitable bracket attached to the saddle of the harness and carrying a rotatable spindle, straps attached to this spindle and wound thereon in opposite directions, the one being connected with the check rein and the other extending backward to a point within reach of the driver, the spindle being provided with a ratchet disk and a locking dog adapted to engage the disk and provided with an arm projecting into the path of the rearwardly extending strap whereby as the last named strap is pulled the dog is disconnected from the disk, substantially as described.

2. In a checking attachment for harness the combination of a bracket attached to the harness and carrying a rotatable spindle, straps attached to this spindle and wound thereon in opposite directions, a ratchet disk made fast on the spindle, a pawl pivoted on the bracket and normally locking the spindle from rotation, the pawl being provided with an arm adapted to engage the rearwardly extending strap whereby as the latter is drawn backward the spindle is released from the pawl, substantially as described.

3. The combination of the bracket carrying the rotatable spindle, means for locking the spindle from rotation, a strap attached thereto at one extremity and wound thereon, the same being connected with the check rein at the opposite extremity, another strap wound on the spindle in the opposite direction and passing backward underneath an arm formed on the locking device, substantially as described.

In testimony whereof I affix my signature in presence of two witnesses.

WILLIAM LOSER.

Witnesses:
WM. MCCONNELL,
HENRY DEITZ.